(12) United States Patent
Choi

(10) Patent No.: US 11,328,078 B2
(45) Date of Patent: May 10, 2022

(54) METHOD FOR PROTECTING INFORMATION AND DEVICE THEREFOR

(71) Applicant: Samsung Electronics Co., Ltd., Suwon-si (KR)

(72) Inventor: Yeon-Kyu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 390 days.

(21) Appl. No.: 16/464,218

(22) PCT Filed: Nov. 22, 2017

(86) PCT No.: PCT/KR2017/013311
§ 371 (c)(1),
(2) Date: May 24, 2019

(87) PCT Pub. No.: WO2018/097581
PCT Pub. Date: May 31, 2018

(65) Prior Publication Data
US 2019/0392165 A1 Dec. 26, 2019

(30) Foreign Application Priority Data
Nov. 24, 2016 (KR) .................. 10-2016-0157254

(51) Int. Cl.
*G06F 21/00* (2013.01)
*G06F 21/62* (2013.01)
(Continued)

(52) U.S. Cl.
CPC ...... *G06F 21/6218* (2013.01); *G06F 16/2365* (2019.01); *G06F 16/245* (2019.01);
(Continued)

(58) Field of Classification Search
CPC .. G06F 21/6218; G06F 16/258; G06F 16/245; G06F 2221/033; G06F 16/2365;
(Continued)

(56) References Cited

U.S. PATENT DOCUMENTS 7,904,472 B1 3/2011 Kamik
8,631,497 B1 * 1/2014 Oliphant ............... G06F 21/577
726/25

(Continued)

FOREIGN PATENT DOCUMENTS

KR 10-0832804 B1 5/2008
KR 10-1134091 B1 4/2012
(Continued)

OTHER PUBLICATIONS

ISA/KR, "International Search Report and Written Opinion of th International Search Report," International Application No. PCT/KR2017/013311, dated Mar. 5, 2018, 9 pages.
(Continued)

*Primary Examiner* — Tri M Tran

(57) ABSTRACT

Various embodiments of the disclosure provide an apparatus for protecting information. According to various embodiments of the disclosure, an apparatus for monitoring a database includes a transceiver, and a processor operatively coupled to the transceiver. The processor may be configured to acquire a query used in access of the database from the database through the transceiver, replace a first code, included in the acquired query, for query checking to a predefined text, convert the text to a second code for query checking, and output information on validity of the acquired query on the basis of a comparison result of the first code and the second code.

14 Claims, 13 Drawing Sheets

(51) Int. Cl.
*G06F 16/245* (2019.01)
*G06F 16/25* (2019.01)
*G06F 16/23* (2019.01)
*G06F 21/56* (2013.01)

(52) U.S. Cl.
CPC .......... *G06F 16/258* (2019.01); *G06F 21/566* (2013.01); *G06F 2221/033* (2013.01)

(58) Field of Classification Search
CPC ........... G06F 21/566; G06F 2221/2115; G06F 21/554
See application file for complete search history.

(56) References Cited

U.S. PATENT DOCUMENTS

| | | |
|---|---|---|
| 9,292,689 B1 | 3/2016 | Chuo et al. |
| 2012/0117644 A1* | 5/2012 | Soeder .................. G06F 21/554 726/22 |
| 2014/0283096 A1* | 9/2014 | Neerumalla ...... G06F 16/24564 726/26 |
| 2015/0150075 A1* | 5/2015 | Vahlis ................... G06F 21/602 726/1 |
| 2015/0269223 A1 | 9/2015 | Miranker et al. |
| 2015/0304337 A1* | 10/2015 | Nguyen-Tuong ..... G06F 40/169 726/1 |
| 2016/0036841 A1 | 2/2016 | Rodniansky |

FOREIGN PATENT DOCUMENTS

| | | |
|---|---|---|
| KR | 10-1143998 B1 | 5/2012 |
| KR | 10-1407717 B1 | 6/2014 |

OTHER PUBLICATIONS

Kim Tae-yong, "Let's stop SQL injection attack!," Taeyo.net, Aug. 4, 2004, 23 pages.

\* cited by examiner

METHOD FOR PROTECTING INFORMATION AND DEVICE THEREFOR

CROSS-REFERENCE TO RELATED APPLICATIONS

This application is a 371 National Stage of International Application No. PCT/KR2017/013311, filed Nov. 22, 2017, which claims priority to Korean Patent Application No. 10-2016-0157254, filed Nov. 24, 2016, the disclosures of which are herein incorporated by reference in their entirety.

BACKGROUND

1. Field

Various embodiments of the disclosure are for protecting information, and in particular, to a method and apparatus for protecting information by detecting a query abnormally injected to a database.

2. Description of Related Art

A DataBase (DB) is a device for securely storing large-volume data, and is used by an enterprise to store and manage information (e.g., user information) which requires security and to be systematic. In addition, a program to be executed by a user or data to be managed by the user is stored in the DB instead of being stored in a user's personal storage device. Therefore, there is an increase in the use of cloud computing in which the user executes the program through communication with the DB or manages the data.

The data stored in the DB may be subject to hacking because it includes sensitive information which requires security (e.g., user's personal information). Accordingly, techniques for preventing the DB from being invaded by hacking (e.g., a SQL injection prevention technique) have been introduced.

SUMMARY

However, although most DB administrators are spending time to prevent hacking, in fact, it is common that they do not check whether the DB administrated by them is invaded by a hacker.

The number of queries requested to the DB may range from thousands to hundreds of millions depending on a service scale. Among the many queries, it is impossible to identify a query caused by abnormal access through the entire validation. Some DB administrators manually identify an abnormal query from queries determined to be slow queries. However, there is no criterion for determining whether the query is a normal query or an abnormal query, and it is common that the number of queries determined as the slow queries is too great to be verified by a person. That is, in order to verify the abnormal query, in fact, a great number of queries are manually verified, which is almost not carried out.

Therefore, various embodiments of the disclosure provide a method and apparatus for protecting information.

In addition, various embodiments of the disclosure provide a method and apparatus for detecting an abnormal query which is injected to a DB.

In addition, various embodiments of the disclosure provide a method and apparatus for creating a query for hacking detection.

According to various embodiments of the disclosure, an apparatus for monitoring a database includes a transceiver, and a processor operatively coupled to the transceiver. The processor may be configured to acquire a query used in access of the database from the database through the transceiver, replace a first code, included in the acquired query, for query checking to a predefined text, convert the text to a second code for query checking, and output information on validity of the acquired query on the basis of a comparison result of the first code and the second code.

According to various embodiments of the disclosure, an apparatus for creating a query to have access a database includes a transceiver, and a processor operatively coupled to the transceiver. The processor may be configured to receive information for access to the database through the transceiver, create a query including a predefined text on the basis of the information, convert the text into a code for query checking, and transmit the query including the converted code for checking to the database through the transceiver.

According to various embodiments of the disclosure, a method for monitoring a database includes acquiring a query used in access of the database from the database, replacing a first code, included in the acquired query, for query checking to a predefined text, converting the text to a second code for query checking on the basis of code information, and outputting information on validity of the acquired query on the basis of a comparison result of the first code and the second code.

According to various embodiments of the disclosure, a method of creating a query to have access a database includes receiving information for access to the database, creating a query including a predefined text on the basis of the information, converting the text into a code for checking, and transmit the query including the converted code for checking to the database through the transceiver.

A method and an electronic device thereof according to various embodiments can detect hacking occurrence by identifying an abnormal query.

In addition, a method and an electronic device thereof according to various embodiments can detect an abnormal query injected to a database by using a code included in the query.

In addition, a method and an electronic device thereof according to various embodiments can create a query for hacking detection by adding a code to the query.

Due to automatic hacking detection according to various embodiments of the disclosure, hacking incidents can be reduced, and even an intention to invade a database through hacking can be prevented.

DETAILED DESCRIPTION

Figure 1:
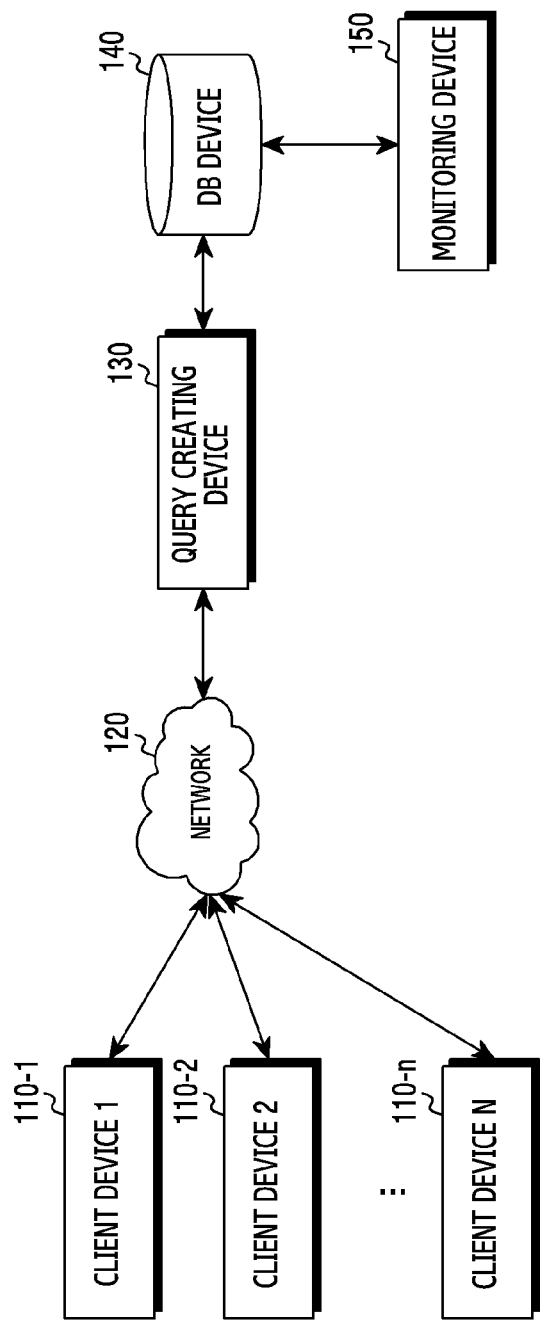
FIG. 1 illustrates an example of a network environment according to various embodiments of the disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be a generic-purpose processor (such as a Central Processing Unit (CPU) or an application processor) that can perform a corresponding operation by executing at least one software program stored at an exclusive processor (such as an embedded processor) for performing a corresponding operation or at a memory device.

FIG. 1 illustrates an example of a network environment according to various embodiments of the disclosure. Referring to FIG. 1, the network environment may include client devices including a client device_1 110-1 and a client device_2 110-2 to a client device N 110-$n$, a network 120, a query creating device 130, a DataBase (DB) device 140, and a monitoring device 150.

The client devices 110-1 to 110-$n$ are devices for performing at least one function. For example, the client devices 110-1 to 110-$n$ may include at least one of a smart phone, a tablet Personal Computer (PC), a mobile phone, a video phone, an electronic book reader, a desktop PC, a laptop PC, a netbook computer, a workstation, a server, a Personal Data Assistant (PDA), a Portable Multimedia Player (PMP), a Motion Picture Experts Group-1 audio layer-3 (MP3) player, a medical device, a camera, and a wearable device.

The client devices 110-1 to 110-$n$ according to various embodiments of the disclosure may communicate with the DB device 140. For example, the client devices 110-1 to 110-$n$ may perform functions for having access to the DB device 140 through the network 120 and the query creating device 130, receiving data stored in the DB device 140 from the DB device 140, changing data stored in the DB device 140, or storing data in the DB device 140. That is, each of the client device 110-1 to 110-$n$ may have an authority to have access to the DB device 140, and may request the query creating device 130 to have access to the DB device 140 and to read data or the like. Specifically, each of the client devices 110-1 to 110-$n$ may execute a webpage, application, program, or the like authenticated for normal access to the DB device 140, and may transmit a request for data to the query creating device 130 through the webpage, the application, or the program. Herein, the request to be transmitted to the query creating device 130 may include at least one parameter required to create the query.

The network 120 is a path for communication between devices. For example, the network 120 may include a path based on a direct access for communication between devices, a Personal Area Network (PAN), a Local Area Network (LAN), a Metropolitan Area Network (MAN), a Wide Area Network (WAN), or a combination thereof. In various embodiments of the disclosure, the network 120 may provide the path for communication with the client devices 110-1 to 110-$n$ and the query creating device 130.

The query creating device 130 is a device that can be used to have access to a DB according to the request of the client devices 110-1 to 110-$n$, and may be implemented as a Web Application Server (WAS). The query creating device 130 according to various embodiments of the disclosure may create a query to have access to data stored in the DB device 140. More specifically, the query creating device 130 may receive information (e.g., at least one parameter) regarding data to be accessed from the client devices 110-1 to 110-$n$ through the network 120, and may create a query on the basis of the received information. For example, upon receiving a request for data reading, the query creating device 130 may transmit the created query to the DB device 140, receive data from the DB device 140, and transmit the received data to the client devices 110-1 to 110-$n$.

The DB device 140 is a device for storing data. For example, the DB device 140 may store data to be provided to another device and a program for managing data to be stored. The program for managing the data may be based on a Structured Query Language (SQL). The DB device 140 according to various embodiments of the disclosure may receive a query from the query creating device 130, and may provide data to the query creating device 130 on the basis of the received query. In addition, in various embodiments of the disclosure, the DB device 140 may determine a query for which a time consumed from a time of receiving the query to a time of processing corresponding data exceeds a reference time among a plurality of received queries. The query exceeding the reference time (e.g., 0.3 seconds) may be referred to as a slow query. The DB device 140 may write and output information on the slow query. For example, the DB device 140 may output information on the slow query to the monitoring device 150 of FIG. 1.

The monitoring device 150 checks whether the DB device 140 is hacked. More specifically, the monitoring device 150 may detect whether the DB device 140 is invaded by an abnormal query. In various embodiments of the disclosure, the monitoring device 150 checks validity of each query transmitted to the DB device 140, and upon detecting an invalid query, may output information which reports that the DB device 140 is invaded.

Although it is described in FIG. 1 that the query creating device 130, the DB device 140, and the monitoring device 150 are separate entities, at least two devices out of the query creating device 130, the DB device 140, and the monitoring device 150 may be implemented as one entity. For example, the monitoring device 150 may include the DB device 140.

In various embodiments of the disclosure, an access from the client devices 110-1 to 110-n or the network 120 to the query creating device 130 may be performed through a unique path. In addition, the path for the access from the query creating device 130 to the DB device 140 may also be performed through the unique path. A network area which is accessible through the unique path may be referred to as a private zone.

In addition to the client devices 110-1 to 110-n, hacking to the DB device 140 may be attempted from another device. In other words, the DB device 140 may be accessed through an abnormal path, other than a normal data access through the client devices 110-1 to 110-n. For example, a hacker may acquire an administrator's authority of the query creating device 130 through an abnormal path, and may transmit a randomly created query, different from a query created by the query creating device 130, to the DB device 140. Hereinafter, the randomly created query, different from the query created by the query creating device 130a, is referred to as an 'abnormal query', and a method and apparatus for detecting the abnormal query are provided.

Various embodiments of the disclosure may provide a system for hacking detection. In various embodiments of the disclosure, the system for hacking detection may include a client device transmitting information for a data request, a query creating device creating a query including a code for query checking on the basis of information received from the client device, a database device outputting data corresponding to the query on the basis of a query received from the query creating device, and a monitoring device acquiring the query from the database device, comparing a code for the query checking, included in the query, and a code calculated by query calculation, and outputting information on validity of the query on the basis of a comparison result.

Figure 2:
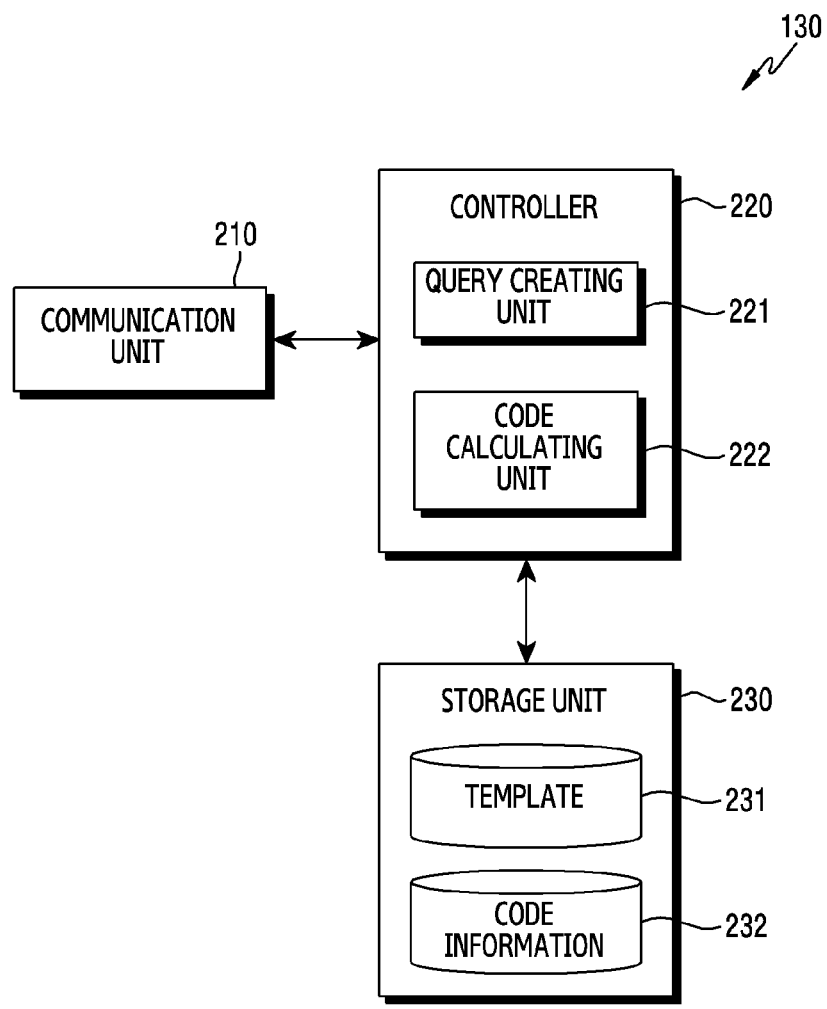
FIG. 2 illustrates an example of a functional structure of a query creating device according to various embodiments of the disclosure.

FIG. 2 illustrates an example of a functional structure of the query creating device 130 according to various embodiments of the disclosure. Hereinafter, the term ' . . . unit', ' . . . device', or the like implies a unit of processing at least one function or operation, and may be implemented in hardware or software or in combination of the hardware and the software.

Referring to FIG. 2, the query creating device 130 may include a communication unit 210, a controller 220, and a storage unit 230.

The communication unit 210 is configured to perform a function for communication with another device. More specifically, the communication unit 210 may receive a signal from a different device coupled to a query creating device under the control of the controller 220 or transmit a signal to the different device, and may perform typical functions (e.g., signal conversion) required for signal transmission/reception. The communication unit 210 may be referred to as a transmitter, a receiver, or a transceiver.

The controller 220 controls operations for performing a function of the query creating device 130. For example, the controller 220 may transmit and receive a signal through the communication unit 210. In addition, the controller 220 may write or read data in the storage unit 230. For this, the controller 220 may include at least one processor or microprocessor, or may be part of the processor. The controller 220 may create a query to be transmitted to the DB device 140, by using a parameter received from the client devices 110-1 to 110-n through the communication unit 210. In particular, the controller 220 may control the query creating device 130 to create a query for hacking detection according to various embodiments to be described below. For example, the controller 220 may control a terminal to perform a procedure according to various embodiments to be described below.

In various embodiments of the disclosure, the controller 220 may include a query creating unit 221 and a code calculating unit 222. The query creating unit 221 may create a query to be transmitted to the DB device 140 on the basis of information received through the communication unit 210 or data stored in the storage unit 230. In this case, according to various embodiments, the query creating unit 221 may create a query including a predefined text at a predefined location. For example, the query creating unit 221 may create a query "SELECT 1 FROM DUAL" on the basis of received parameters, and may create "SELECT/* #REPLACE_CODE#*/1 FROM DUAL;" by inserting a predefined text 'REPLACE_CODE'. The code calculating unit 222 may create a code to be added to a query to be transmitted to the DB device 140 on the basis of information received through the communication unit 210 or data stored in the storage unit 230, and may provide the created code to the query creating unit 221. For example, the code calculating unit 222 may determine a code (e.g., 'aefhygegh') for replacing a predefined text (e.g., 'REPLACE_CODE') according to a predetermined encryption scheme, and may create a final query "SELECT/*#aefhygegh#*/1 FROM DUAL;" to be transmitted to the DB device 140.

The storage unit 230 is configured to store data such as a basic program, application program, setup information, or the like for an operation of the query creating device 130. The storage unit 120 may be a volatile memory, a non-volatile memory, or a combination of the volatile memory and the non-volatile memory. The storage unit 230 may provide stored data at the quest of the controller 130. The storage unit 230 of FIG. 2 may store a template 231 and code information 232.

The template 231 is information on a predefined format for creating a query to be transmitted to the DB device 140. For example, part of the template 231 may be provided to the query creating unit 221 of the controller 220, and the query creating unit 221 may create a query to be transmitted to the DB device 140 by adding a parameter acquired through the communication unit 210 to the template 231 (or part of the template 231). Code information 232 of FIG. 2 may include information for creating a code to be added to the query. For example, the code information 232 may include information on a key required to convert a predefined text included in the query in the code calculating unit 222.

Various embodiments of the disclosure may provide an apparatus for monitoring a database. In various embodiments of the disclosure, the apparatus for monitoring the database includes a transceiver, and a processor operatively coupled to the transceiver. The processor may be configured to acquire a query used in access of the database from the database through the transceiver, replace a first code, included in the acquired query, for query checking to a predefined text, convert the text to a second code for query checking, and output information on validity of the acquired query on the basis of a comparison result of the first code and the second code. In addition, in various embodiments of the disclosure, the first code may be included in the acquired query as an annotation of the acquired query. In addition, in various embodiments of the disclosure, the first code may be disposed to a predetermined location of the acquired query. In addition, in various embodiments of the disclosure, the acquired query may be a query identified as consuming a greater time than a predetermined time for data access among a plurality of queries used in the access to the database. In addition, in various embodiments of the disclosure, the processor may be configured to determine the text on the basis of a type of the query. In addition, in various embodiments of the disclosure, the processor may be configured to output an alarm which notifies that hacking to the database occurs if the first code and the second code are not matched to each other. In addition, in various embodiments of the disclosure, the processor may be configured to display a screen which indicates the alarm through a display or to transmit a message which notifies the alarm to another apparatus.

Figure 3:
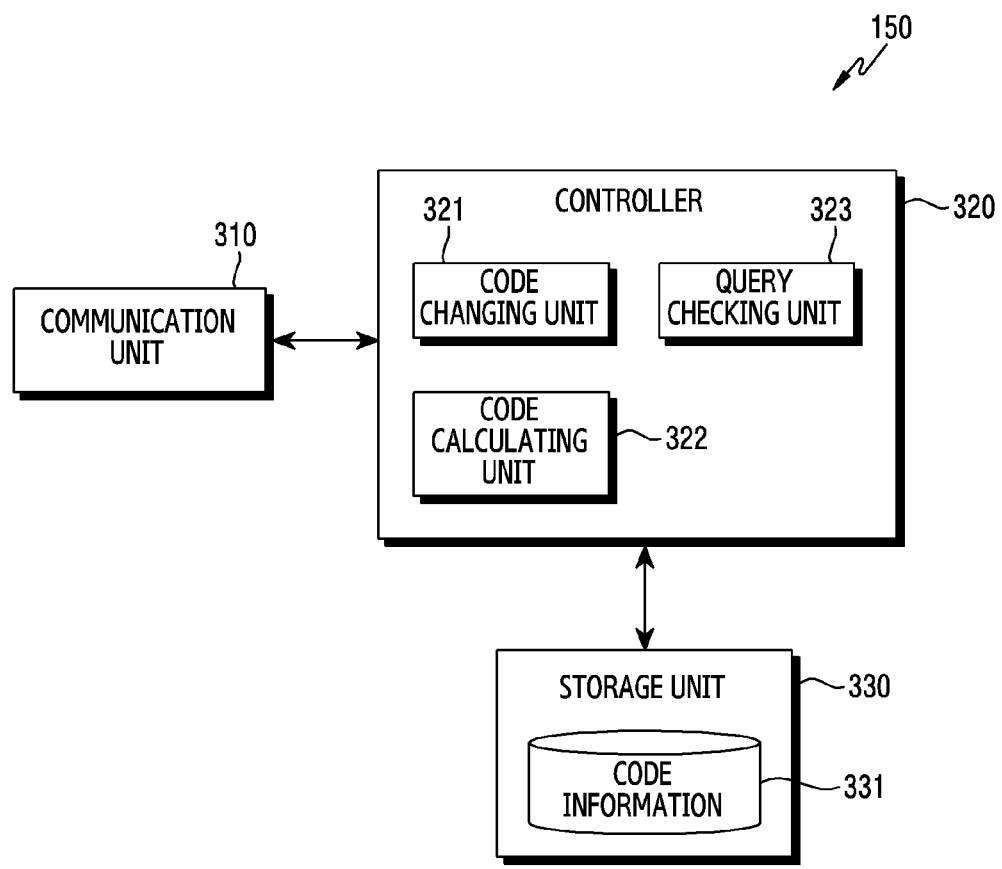
FIG. 3 illustrates an example of a functional structure of a monitoring device according to various embodiments of the disclosure.

FIG. 3 illustrates an example of a functional structure of the monitoring device 150 according to various embodiments of the disclosure.

Referring to FIG. 3, the monitoring device 150 may include a communication unit 310, a controller 320, and a storage unit 330.

The communication unit 310 may include a structure similar to the communication unit 210 of FIG. 2, and may be configured to perform a function for communication with a device different from the monitoring device 150.

The controller 320 may include a structure similar to the controller 220 of FIG. 2, and may control operations for performing a function of the monitoring device 150. The controller 320 of FIG. 3 may include a code changing unit 321, a code calculating unit 322, and a query checking unit 323.

The code changing unit 321a may change a portion corresponding to a code for checking in a query acquired through the communication 310 into a predefined text. For example, upon acquiring a query "SELECT/*#aefhy-gegh#*/1 FROM DUAL;", a query 'aefhygegh' corresponding to a code for checking may be changed to a predefined text 'REPLACE_CODE'. In other words, the code changing unit 321 may create a query including the predefined text instead of a query corresponding to the code for checking in the received query.

The code calculating unit 322 may convert a text changed in the code changing unit 321 into a code for checking according to a predetermined encryption scheme (e.g., a hash algorithm, symmetric key encryption, or electronic signature encryption). In other words, the code changing unit 321 may convert a text to a code for checking by using code information 331 stored in the storage unit 330, from a query including a text provided from the code changing unit 321. The code calculating unit 322 of FIG. 3 may perform a function similar to the code calculating unit 222 of FIG. 2.

The query checking unit 323 may compare a code for checking, provided from the code calculating unit 322, and a code for checking, included in a query acquired through the communication unit 310. More specifically, if the code for checking, provided from the code calculating unit 322, is matched to the code for checking, included in the query acquired through the communication unit 310, the query checking unit 323 may output that the query is a valid query, and otherwise, may output that the query is an invalid query. Upon identifying the invalid query, the monitoring device 150 may output a message for informing that the DB device 140 is invaded. Although it has been described that the code changing unit 321, code calculating unit 322, and query checking unit 323 of the controller 320 are separate devices or modules, each of the code changing unit 321, the code calculating unit 322, and the query checking unit 323 may be performed by the same hardware device (e.g., processor).

The storage unit 330 is configured to store data such as a basic program, application program, setup information, or the like for an operation of the monitoring device 130. The storage unit 330 of FIG. 3 may be configured to perform a function similar to the storage unit 230 of FIG. 2.

The code information 331 is information stored in the storage unit 330, and may include information for creating a code to be added to a query. For example, the code information 232 may include information on a key required for conversion of a text for checking, included in the query in the code calculating unit 222.

Various embodiments of the disclosure may provide an apparatus for creating a query to have access to a database. In various embodiments of the disclosure, the apparatus for accessing the database may include a transceiver, and a processor operatively coupled to the transceiver. The processor may be configured to receive information for access to the database through the transceiver, create a query including a predefined text on the basis of the information, convert the text into a code for query checking, and transmit the query including the code for query checking to the database through the transceiver. In addition, in various embodiments of the disclosure, the code for query checking may be included in the query as an annotation at a predetermined location of the query. In addition, in various embodiments of the disclosure, the processor may be configured to determine the text on the basis of a type of the query.

Figure 4:
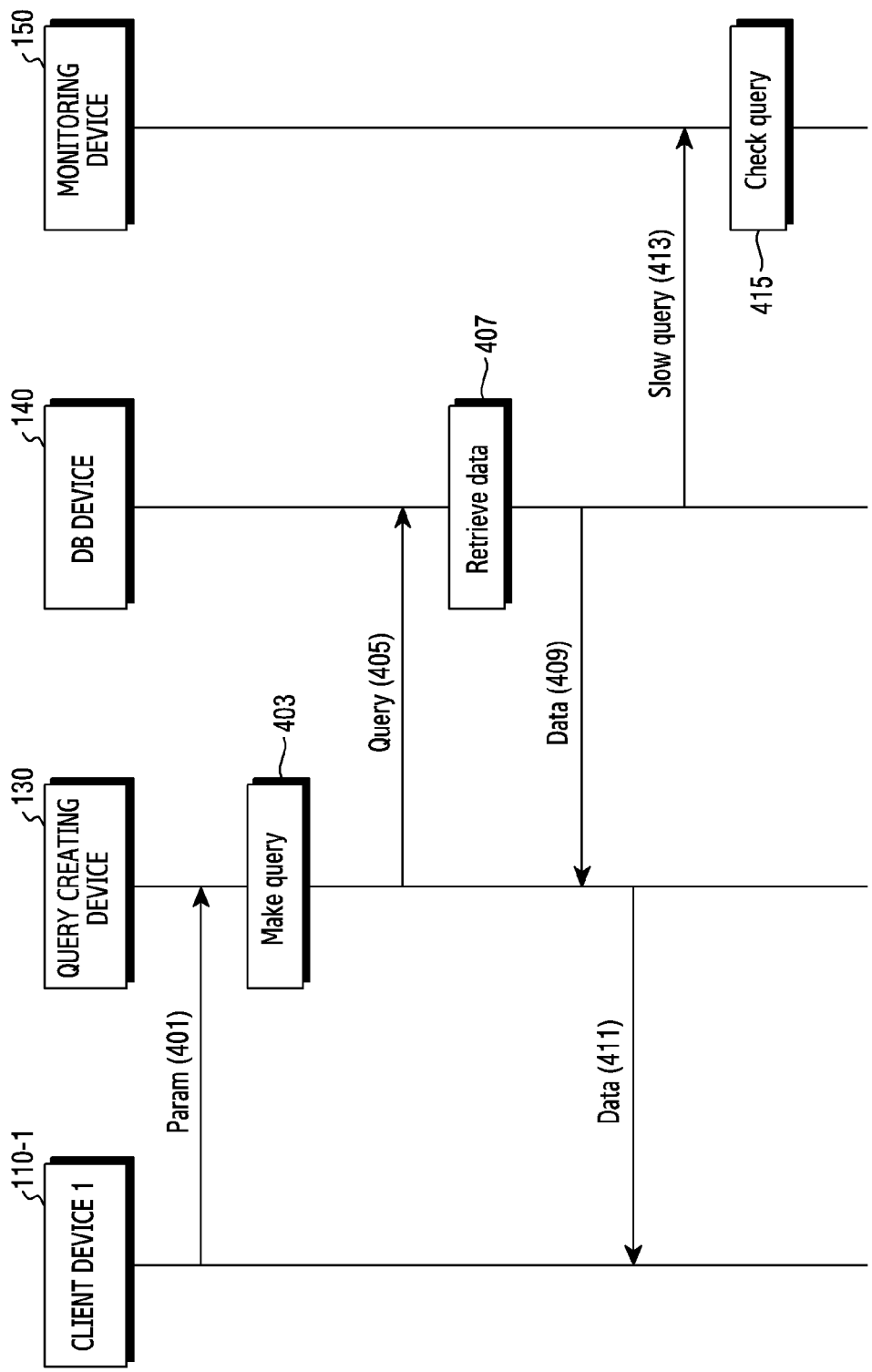
FIG. 4 illustrates an example of a signal flow for a case where a database device is accessed normally according to various embodiments of the disclosure.

FIG. 4 illustrates an example of a signal flow for a case where a database device is accessed normally according to various embodiments of the disclosure. The embodiment of FIG. 4 illustrates an example of accessing the DB device 140 due to a normal path by the client device_1 110-1.

Referring to FIG. 4, in operation 401, the client device_1 110-1 may transmit information for accessing the DB device 140 to the query creating device 130. For example, the client device_1 110-1 may transmit to the query creating device 130 a parameter required to acquire data stored in the DB device 140 or required to store data in the DB device 140.

Figure 6:
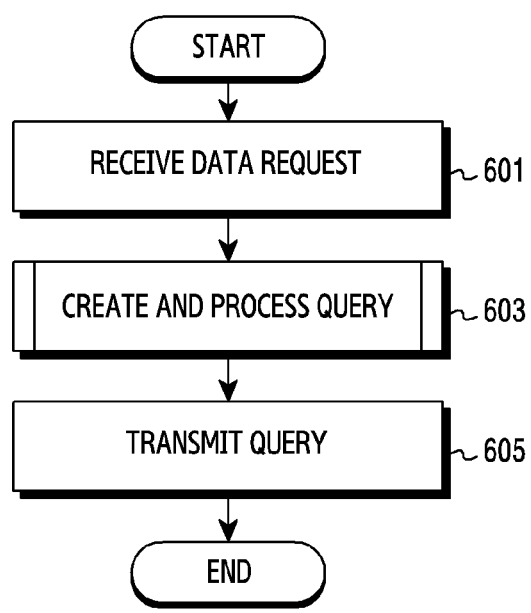
FIG. 6 illustrates an example of a flowchart for creating a query in a query creating device according to various embodiments of the disclosure.

In operation 403, the query creating device 130 may create a query on the basis of the received parameter. More specifically, the query creating device 130 may create a query to have access to the DB device 140 by adding the parameter received through the communication unit 210 to a templet stored in the storage unit 230. In various embodiments of the disclosure, the query creating unit 221 of the query creating device 130 may create a query, to which a code for checking validity of the query is added, in the templet 231 stored in the storage unit 230, together with a parameter. More specifically, the query creating unit 221 may add a predefined text in the templet 231 stored in the storage unit 230 together with the parameter received in operation 401. The code calculating unit 222 of the query creating device 130 may convert the pre-defined text into a code for checking by using code information 232 stored in the storage unit 230. The code calculating unit 222 may provide the code for checking to the query creating unit 221. The query creating unit 221 may create a query including the code for checking. For example, referring to FIG. 10, a query 1001 may be created in which the text 'REPLACE_CODE' is added in a form of an annotation not having effect on the processing of the query. Herein, the query creating procedure may be performed as shown in the flowchart of FIG. 6.

In operation 405, the query created in the query creating device 130 may be transmitted from the query creating device 130 to the DB device 140. A query to be transmitted may correspond to a normal query to which a code for checking validity of the query is added. For example, in FIG. 10, a query to which a code 'adfgeefe' for checking is added as an annotation may be transmitted to the DB device 140.

Figure 10:
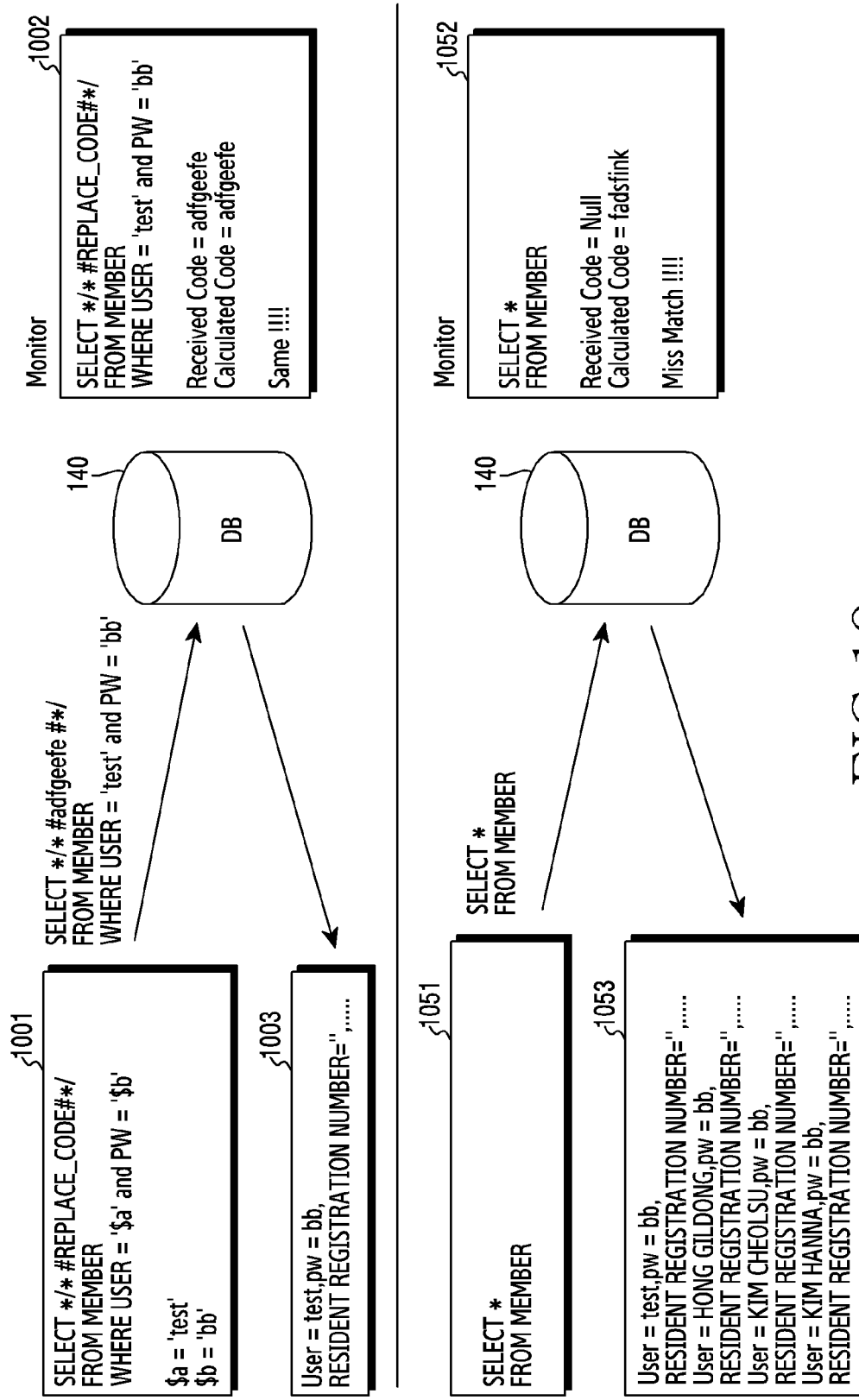
FIG. 10 illustrates query checking according to various embodiments of the disclosure.

In operation 407, the DB device 140 may process data stored in the DB device 140 from information included in the received query. Specifically, the DB device 140 may perform an operation corresponding to a command included in the received query for data corresponding to identification information of data included in the received query. For example, as shown in FIG. 10, if the received query is "SELECT*/*#adfgeefe#*/FROM MEMBER WHERE USER='test' and PW='bb'", the DB device 140 may perform an operation corresponding to 'SELECT' for data corresponding to USER='test' and PW='bb' from a group called 'MEMBER'.

In operation 409, data corresponding to the query transmitted to the DB device 140 may be transmitted from the DB device 140 to the query creating device 130. For example, referring to FIG. 10, information 1003 corresponding to the query received in the DB device 140 may be transmitted. Thereafter, in operation 411, data received in the query creating device 130 may be transmitted to the client device_1 110-1. Although an example in which data is transferred from the DB device 140 to the client device_1 110-1 is illustrated for a case where a request of the client device_1 110-1 is for data reception, another operation may be performed according to a request of the client device_1 110-1. For example, if the request of the client device_1 110-1 is for data storing, operations 409 and 411 may be skipped, or a signal transmitted in operations 409 and 411 may be an Acknowledge (ACK) message corresponding to the request of the client device_1 110-1.

In operation 413, information for a slow query output from the DB device 140 may be transmitted to the monitoring device 150. The slow query is a query for which at least a specific time is consumed in the query processing, and the DB device 140 may output the slow query through filtering among received queries.

Figure 7:
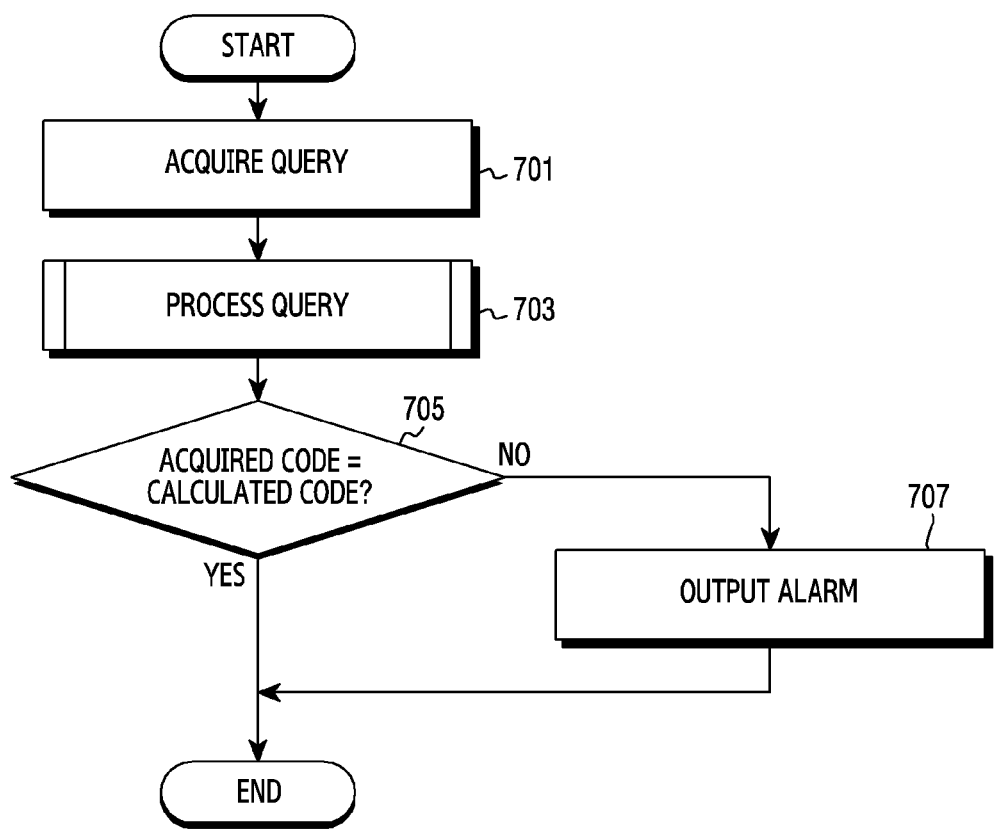
FIG. 7 illustrates an example of a flowchart for determining hacking in a monitoring device according to various embodiments of the disclosure.

In operation 415, the monitoring device 150 may check validity of a corresponding query from information on the sow query received from the DB device 140. More specifically, from the acquired query, the monitoring device 150 may compare a code for checking, included in the query, and a code for checking, converted from a predefined text, and if the two codes are matched, may identify that the query is a valid query. For example, referring to FIG. 10, upon identifying that a query 'adfgeefe' included in the received query is matched to a calculated query 'adfgeefe', it may be identified that the query is a valid query (see 1002). The procedure of identifying validity of the query may be performed as shown in the flowchart of FIG. 7.

FIG. 4 illustrates an operation for checking validity for a query determined as a slow query among queries received in the DB device 140. It is assumed herein that there is a possibility that the slow query is a query for hacking. In general, unlike in a query created by the query creating device 130 as in the embodiment of the disclosure, this is because a query created for the purpose of hacking takes a long time to acquire desired data due to a lack of a knowledge for a data structure of the DB device 140. However, according to another embodiment, validity checking may be performed on queries classified based on different criteria, other than a slow query classified based on a query processing time. In addition, according to another embodiment, the monitoring device 150 may perform validity checking on all queries received in the DB device 140.

Figure 5:
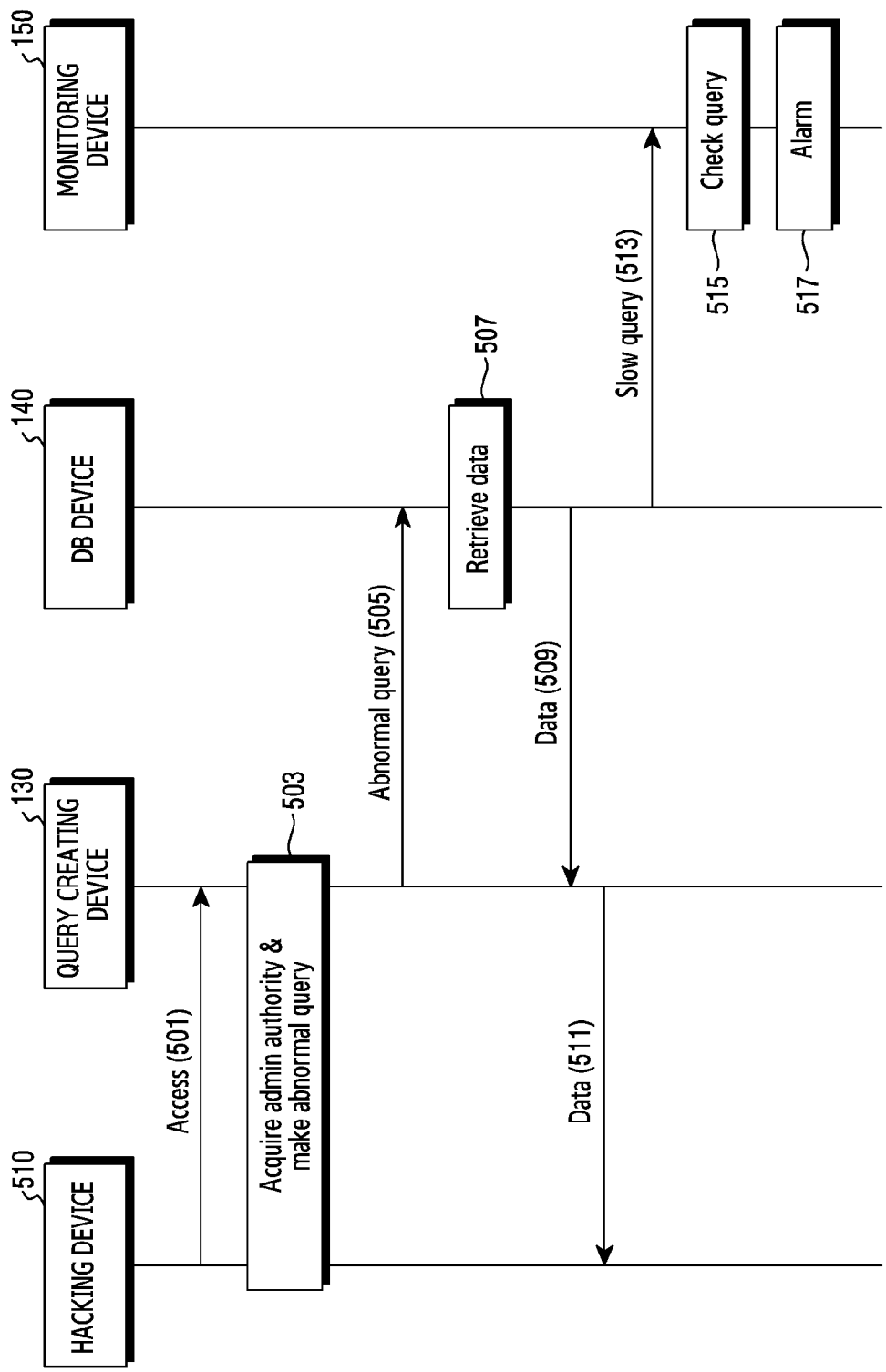
FIG. 5 illustrates an example of a signal flow for a case where a database is accessed abnormally according to various embodiments of the disclosure.

FIG. 5 illustrates an example of a signal flow for a case where a database is accessed abnormally according to various embodiments of the disclosure. The embodiment of FIG. 5 illustrates an example of a case where a hacking device 510 has access to the DB device 140 through an abnormal path for the purpose of hacking.

Referring to FIG. 5, in operation 501, the hacking device 510 may have access to the query creating device 130. An access to the query creating device 130 of the hacking device 510 may be an access for approaching the database 140. For example, in operation 501, the hacking device 510 may perform an operation for invading the query creating device 130 and for acquiring an administrator's authority of the query creating device 130 or DB device 140.

In operation 503, the hacking device 510 which has successfully invaded the query creating device 130 may acquire the administrator's authority of the query creating device 130 or DB device 140, and may create an abnormal query for processing data stored in the DB device 140. Unlike the normal query created by a normal access to the query creating device 130, the abnormal query may be a query randomly created by the invasion of the hacking device 510. Unlike in the embodiment of FIG. 4, the abnormal query of FIG. 5 may not include a code for checking, or may be a query including an invalid code. For example, referring to FIG. 10, a query 1051 created abnormally does not include a text to be converted by the encryption algorithm, unlike in a query 1001 created normally. Thereafter, in operation 505, the abnormal query created by the hacking device 510 is transmitted to the DB device 140. In this case, the code for checking is not included in the query to be transmitted.

In operation 507, the DB device 140 may perform processing for data stored in the DB device 140 from information included in the received abnormal query. Specifically, the DB device 140 may perform an operation corresponding to a command included in the received query for data corresponding to identification information of data included in the received abnormal query. For example, as shown in FIG. 10, if the received abnormal query is "SELECT* FROM MEMBER", the DB device 140 may perform an operation corresponding to 'SELECT' for data included in a group called 'MEMBER'. In this case, an access for data belonging to the group 'MEMBER' occurs due to the abnormal query, and the DB device 140 may output data 1053 belonging to 'MEMBER'.

In operations 509 and 511, data output from the DB device 140 may be transmitted to the hacking device 510 via the query creating device 130. In other words, data stored in the DB device 140 may be leaked through hacking carried out by the hacking device 510.

In operation 513, information on a slow query output from the DB device 140 may be transmitted to the monitoring device 150. The slow query is a group of queries for which at least specific time is consumed in the processing of the query, and the DB device 140 may output the slow query through filtering among the received queries. In various embodiments of the disclosure, a query used in the access to the DB device 140 by the hacking device 510 is an abnormal query randomly created and thus is included in the slow query, and information on the abnormal query is transmitted to the monitoring device 150.

In operation 515, the monitoring device 150 may check the acquired query. For example, referring to FIG. 10, a code for checking is not included in the received query and thus is compared with a query 'adfgeefe' for which a NULL value is calculated, and if a mismatch is identified, the monitoring device 150 may identify that a corresponding query is an invalid query (see 1502). The query checking procedure in operation 515 may be performed as shown in the flowchart of FIG. 7.

In operation 517, the monitoring device 150 may output an alarm for hacking occurrence in response to detection of the invalid query. Herein, in order to inform that the DB device 140 is hacked, the alarm may be output through an additional output device (e.g., a display) or may be transmitted to another device in which an administrator is set. Herein, information output by the monitoring device 150 may include information on a source of a query determined as not being valid, a transmission time point of the query, or information on data accessed by the query.

FIG. 6 illustrates an example of a flowchart for creating a query in the query creating device 130 according to various embodiments of the disclosure.

Referring to FIG. 6, in operation 601, the communication unit 210 of the query creating device 130 may receive a request for accessing the DB device 140. For example, the communication unit 210 of the query creating device 130 may receive a parameter for accessing the DB device 140 from the client device_1 110-1 of FIG. 1.

In operation 603, the controller 220 of the query creating device 130 may create and convert a query. More specifically, the controller 220 may create the query by using a parameter received through the communication unit 210 and the templet 231 stored in the query creating device.

Figure 8A:
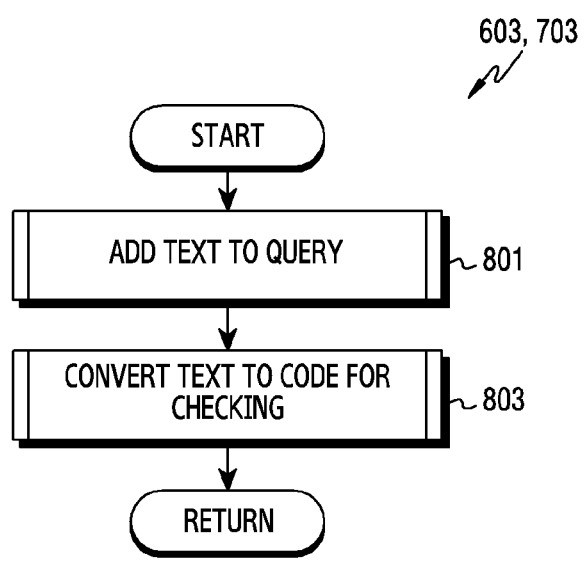
FIG. 8A illustrates an example of a flowchart for checking validity of a query according to various embodiments of the disclosure.

In addition thereto, in operation 603, the controller 220 may create and convert the query through a process of processing a specific query. For example, the query creating unit 221 of the controller 220 may add a predefined text to the created query, and the code calculating unit 222 may convert the added text through an encryption algorithm. The query processing for validity checking of the query may be performed as shown in FIG. 8A.

In operation 605, the controller 220 of the query creating device 130 may transmit the query created through the communication unit 210 to the DB device 140. More specifically, the controller 220 of the query creating device 130 may transmit the query including a code for checking in operation 605 to the DB device 140.

Unlike in the flowchart of FIG. 6, an abnormal query created by a device (e.g., the hacking device 501), which is injected to the query creating device 130 for the purpose of hacking, does not include the code for checking. Alternatively, even if the abnormal query includes a code similar to the code for checking, the included code will not conform to the encryption algorithm used in operation 603. Therefore, it is identified that the abnormal query is an invalid query through a next query checking procedure. On the other hand, it is identified that a normal query created by the procedure of FIG. 6 is a valid query through the query checking procedure.

FIG. 7 illustrates an example of a flowchart for determining hacking in the monitoring device 150 according to various embodiments of the disclosure.

Referring to FIG. 7, in operation 701, the controller 320 of the monitoring device 150 may acquire information on one or more queries. More specifically, the controller 320 of the monitoring device 150 may receive information on one or more queries to be checked from the DB device 140 via the communication unit 310. Herein, the query acquired by the monitoring device 150 may be a query in which a longer time than a reference time is consumed for data processing in the DB device 140. That is, the query acquired by the monitoring device 150 may be a slow query. However, in various embodiments of the disclosure, the query acquired by the monitoring device 150 may be all queries transferred to the DB device 140, and also may be some queries filtered according to a certain criterion among all queries.

In operation 703, the controller 320 of the monitoring device 150 may perform processing for the acquired query. For example, the code changing unit 321 of the controller 320 may add a predefined text to the created query, and the code calculating unit 322 may convert the added text through the encryption algorithm. The code processing procedure of operation 703 may be performed as shown in FIG. 8A.

In operation 705, the controller 320 of the monitoring device 150 may compare a code included in the query acquired from the DB device 140 and a code calculated by the monitoring device 150. More specifically, the query checking unit 323 of the controller 320 may compare a code included in a query acquired through the communication unit 310 in operation 701 and a code calculated by the code calculating unit 322 in operation 703.

If it is determined that the code acquired in operation 705 is matched to the calculated code, the controller 320 of the monitoring device 150 may determine that a corresponding query is a valid query, and may end the process of FIG. 7. However, if the code acquired in operation 705 is not matched to the calculated code, the controller 320 of the monitoring device 150 may determine that the corresponding query is an invalid query, and may proceed to operation 707.

In operation 707, the controller 320 of the monitoring device 150 may output information for informing that the invalid query is detected. For example, the controller 320 of the monitoring device 150 may transmit the information for informing that the invalid query is detected to another device (e.g., a terminal of an administrator) through the communication unit 310, or may display information for informing that the invalid query is detected through a display unit (not shown) of the monitoring device 150. Herein, the information for informing that the invalid query is detected may include information on a corresponding query, e.g., a source of the query, a time at which the query is transmitted, or information on data accessed by the query. An administrator of the DB device 140 may know that hacking occurs in the DB device 140 from information which is output from the monitoring device.

FIG. 8A illustrates an example of a flowchart for checking validity of a query according to various embodiments of the disclosure. The flowchart of FIG. 8A may be included in a process of creating and processing a query in operation 603 of FIG. 6 or a process of processing a code in operation 703 of FIG. 7. Hereinafter, the procedure may be performed by the controller 220 of the query creating device 130 or the controller 320 of the monitoring device 150. For convenience of explanation, hereinafter, an operation entity is referred to as a 'device'.

Figure 8B:
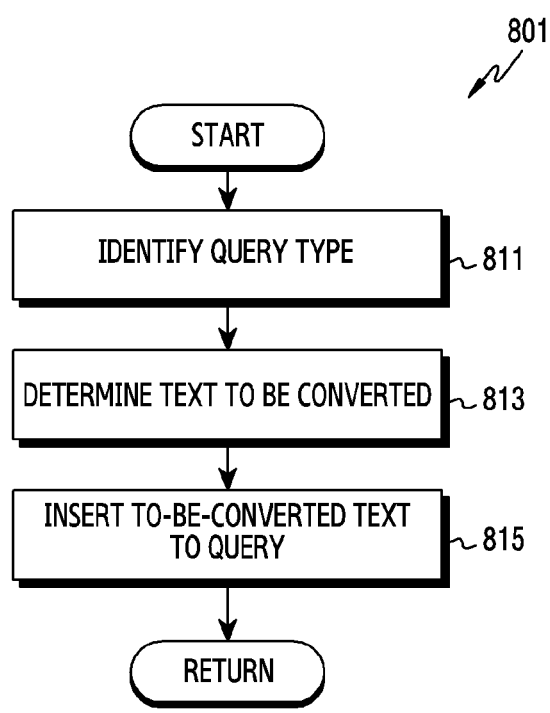
FIG. 8B illustrates an example of a flowchart for creating a query according to various embodiments of the disclosure.

Referring to FIG. 8A, in operation 801, the device may add a predefined text to a query. In some embodiments, the text adding operation in operation 801 may be performed as shown in FIG. 8B. For checking, the predefined text may be added to the query in a form of an annotation. For example, when operation 801 is performed by the controller 220 of the query creating device 130, the query creating unit 221 may create a query ("SELECT/*#REPLACE_CODE#*/A, B, C FROM TABLE_A . . . ") in which a predefined text (e.g., 'REPLACE_CODE') is added at a predefined location. In addition, when operation 801 is performed by the code changing unit 321 of the monitoring device 150, the code changing unit 321 may identify a code included in the acquired query as an annotation, and may change the identified code to a predefined text stored in the storage unit 330. For example, referring to FIG. 9, the code changing unit 321 may identify that 'ABCABCABC' corresponds to a code in "SELECT/*#ABCABCABC#*/A, B, C FROM TABLE_A . . . ", and may transfer a query including a predefined text 'REPLACE_CODE' to the code calculating unit 332 instead of the code 'ABCABCABC'. In addition, the query changing unit 321 may transfer the code 'ABCABCABC' of the acquired query to the query checking unit 323.

In operation 803, the device may convert the text included in the query to a code for checking. The device may convert the text included in the query to the code for checking according to a predefined encryption algorithm. In this case, an input of the encryption algorithm may be the entirety of the query including the text or part of the query. The conversion in operation 803 may be performed by the encryption algorithm, and the encryption algorithm may use a well-known encryption algorithm in this technical field.

Figure 9:
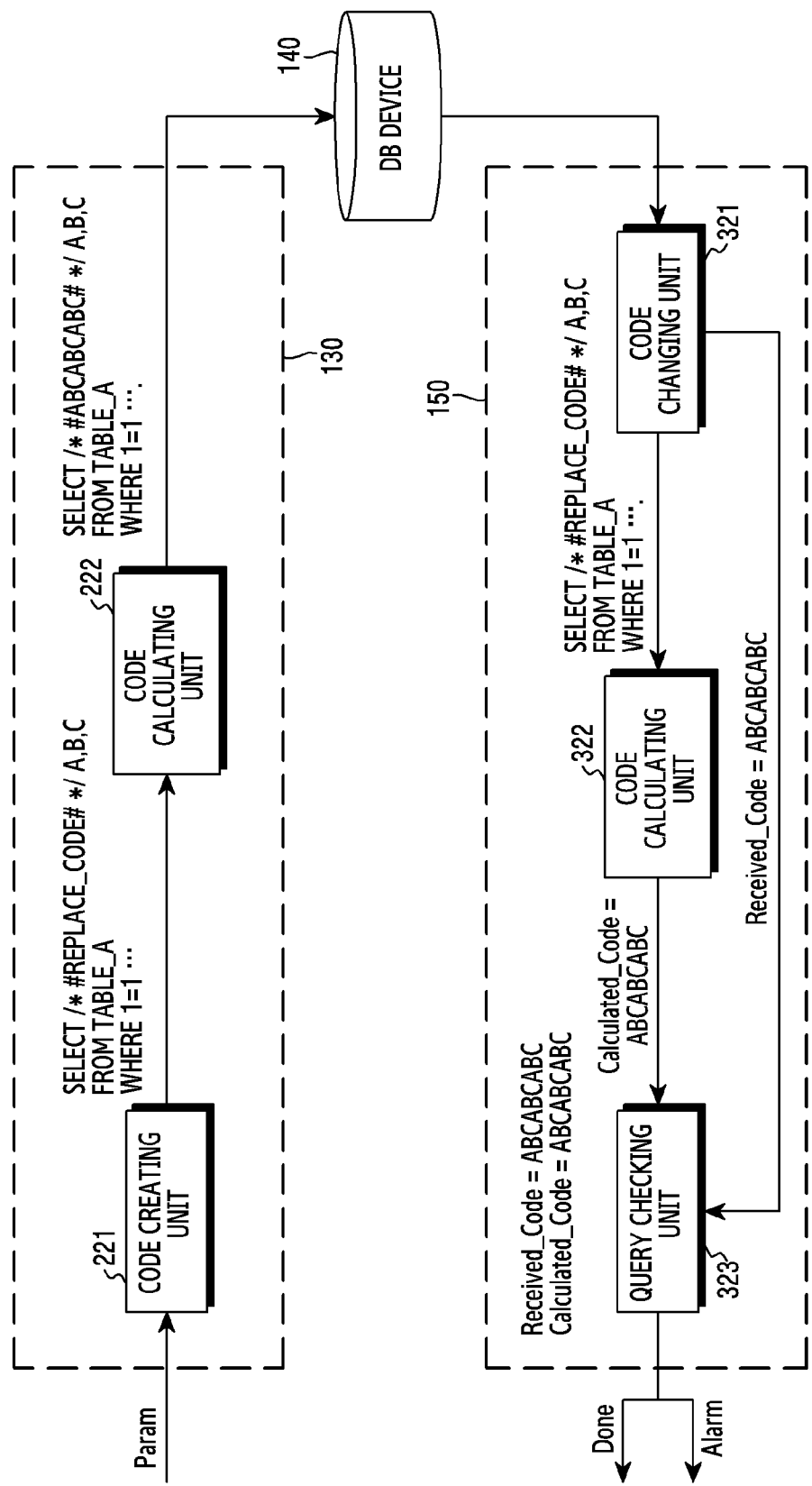
FIG. 9 illustrate an example of a query creating and query checking process according to various embodiments of the disclosure.

When operation 803 is performed by the controller 220 of the query creating device 130, the code calculating unit 222 of the controller 220 may perform conversion on the text included in the query created in operation 801, and may insert a code for checking, acquired by the conversion, into the query instead of the text added in the query. The conversion process in operation 803 may be performed based on the code information 232 stored in the storage unit 230 of the query creating device 130. For example, as shown in FIG. 9, the code calculating unit 222 may convert any text 'REPLACE_CODE' included in the query "SELECT/*#REPLACE_CODE# */A, B, C FROM TABLE_A . . . " created by the query creating unit 221 into a code 'ABCABCABC' for checking by using an encryption logic. Thereafter, the controller 220 may end the operational process of FIG. 8A, and returning to operation 603, may perform an operation for transmitting the created query to the DB device 140. For example, in FIG. 9, the query "SELECT/*#ABCAB-CABC#*/A, B, C FROM TABLE_A . . . " output by the code calculating unit 222 may be transmitted to the DB device 140.

In addition, when operation 803 is performed by the controller 320 of the monitoring device 150, the code calculating unit 322 of the controller 320 may convert the query changed by the code changing unit 321 to the code for checking. In various embodiments of the disclosure, the conversion process in operation 803 may be performed by using the code information 331 stored in the storage unit 330 of the monitoring device 150. For example, as shown in FIG. 9, the code calculating unit 322 may acquire the query including the predefined text 'REPLACE_CODE' from the code changing unit 321, and may output a code for checking by changing the predefined text 'REPLACE_CODE'. Thereafter, the calculated code may be compared with the received code to determine whether the two codes are matched to each other. For example, in FIG. 9, the query checking unit 323 may compare the code 'ABCABCABC' included in the query acquired from the DB device 140 with the code 'ABCABCABC' calculated by the code calculating unit 322, and may determine whether the two codes are matched to each other.

FIG. 8B illustrates an example of a flowchart for creating a query according to various embodiments of the disclosure. Hereinafter, referring to FIG. 8B, an example of an operational process for adding a text to a query will be explained based on the query creating device 130. The flowchart of FIG. 8B illustrates an example of a text adding operation in operation 801 of FIG. 8A. Hereinafter, the procedure may be performed by the controller 220 of the query creating device 130 or the controller 320 of the monitoring device 150. For convenience of explanation, hereinafter, an operation entity is referred to as a 'device'.

Referring to FIG. 8B, in operation 811, the device may identify a type of a query to be created. In various embodiments of the disclosure, the type of the query may be determined according to an operation which is to be performed by the client devices 110-1 to 110-n by accessing the DB device 140. For example, when the client device_1 110-1 intends to inquire data stored in the DB device 140, the query type may correspond to a first type (e.g., a type SELECT), and when the client device_1 110-1 intends to change data stored in the DB device 140, the query type may correspond to a second type (e.g., a type UPDATE).

In operation 811, the device may determine a text to be added to the query according to the query type. More specifically, the query creating unit 221 of the controller 220 may determine a type of the text to be added to the query to change a type of the query to be created. For example, the query creating unit 221 may add a first text (e.g., REPLACE_CODE) for a query corresponding to a first type, and may add a second text (e.g., REPLACE_TEST) for a query corresponding to a second type. In some embodiments, among a plurality of query types, some queries may be configured as a group, and a text may be determined differently for each group.

In operation 813, the controller 220 of the query creating device 130 may insert a determined text to the query. More specifically, the query creating unit 221 of the controller 220 may determine a location and format of a query to be created, and add the determined text to the query according to the determined location and format. In various embodiments of the disclosure, the query creating unit 221 may be located between a command and a field, as a location at which the text is to be added in the query. For example, the text 'REPLACE_CODE' may be disposed such as "SELECT/*#REPLACE_CODE#*/A, B, C FROM TABLE_A". In some embodiments, the text may be located at a last portion of the query such as "SELECT A, B, C FROM TABLE_A/*#REPLACE_CODE#*/". In addition, the text 'REPLACE_CODE' may be located as an annotation in the query such as "SELECT/*#REPLACE_CODE#*/A, B, C FROM TABLE_A". In addition, the code for query checking may be determined to have a specific format. For example, the text 'REPLACE_CODE' for query checking such as "SELECT/*#REPLACE_CODE#*/A, B, C FROM TABLE_A" may be included in the query in a form of '#*REPLACE_CODE#' by being located between '#' in the annotation. Therefore, the created query may be provided to the code calculating unit 222 of the controller 220. Thereafter, the controller 220 may end the operational process of FIG. 8B, and returning to operation 801 of FIG. 8A, may perform an operation for converting the text included in the created query.

In the embodiment described with reference to FIG. 8B, a text to be added according to the query type may be adaptively determined. In addition thereto, according to various embodiments, a location at which the text is to be added may vary depending on the query type. Further, according to another embodiment, an encryption algorithm for determining a code for replacing a text may vary depending on the query type. That is, the device may determine at least one of encryption algorithms for changing a text to be added, a location at which the text is to be added, and the text according to the query type.

Figure 11:
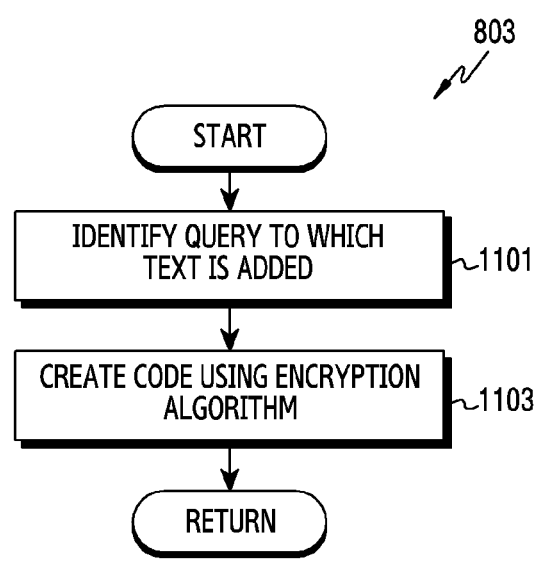
FIG. 11 illustrates an example of a flowchart for determining a code for checking a query using an encryption algorithm according to various embodiments of the disclosure.

FIG. 11 illustrates an example of a flowchart for determining a code for checking a query using an encryption algorithm according to various embodiments of the disclosure. The flowchart of FIG. 11 illustrates an example of a text adding operation in operation 803 of FIG. 8A. The following procedure may be performed by a controller of the query creating device 130 or the controller 320 of the monitoring device 150.

In operation 1101, the device may identify a query to which a predefined text is added. For example, referring to FIG. 12, the code calculating unit 222 of the query creating device 130 may identify a query 1203 in which a predefined text 1202 #REPLACE_CODE# is inserted as an annotation.

Figure 12:
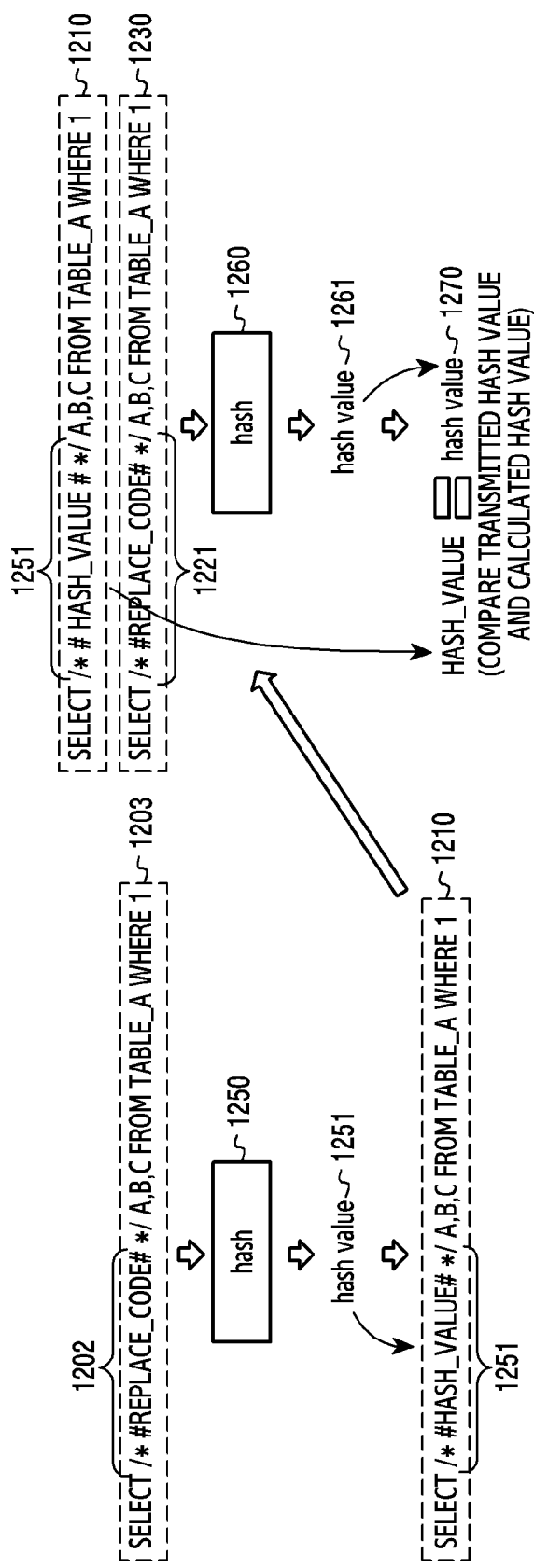
FIG. 12 illustrate an example of a procedure of checking validity of a query by using an encryption algorithm according to various embodiments of the disclosure.
Figure 12:
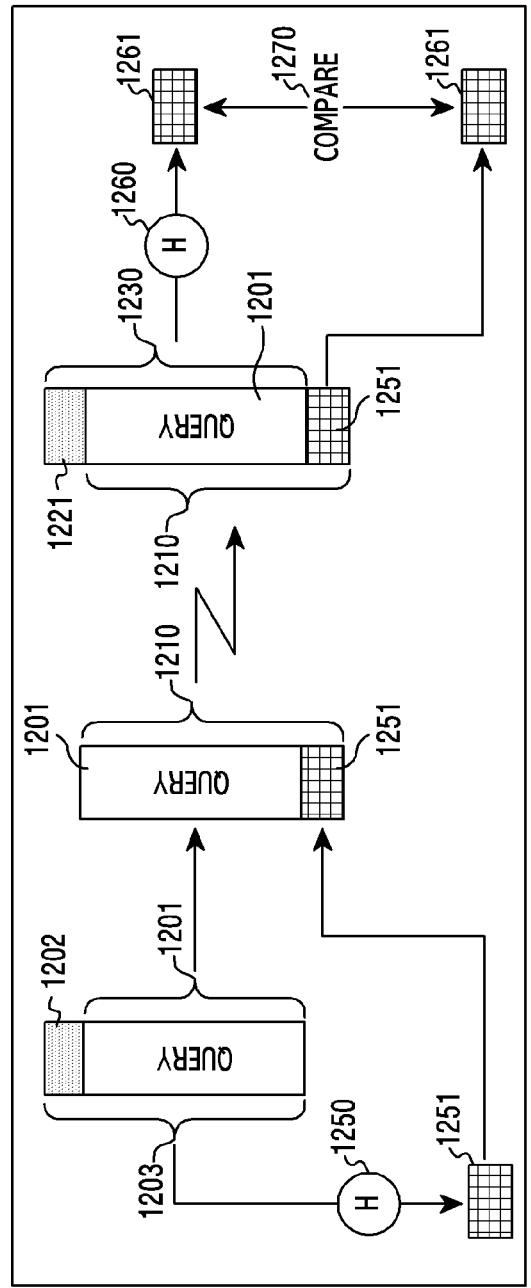

In operation 1103, the device may create a code for checking validity of the query by using an encryption algorithm. For example, referring to FIG. 12, the code calculating unit 222 of the query creating device 130 may acquire a hash value 1251 #HASH_VALUE# calculated from the query created using a hash algorithm 1250. The hash algorithm is an algorithm using a hash function which converts an input value having a variable size into another value having a fixed size, and rapid data processing may be possible in comparison with another symmetric encryption scheme. The example of FIG. 12 is only for explaining an encryption process using a hash algorithm in the disclosure as one example of the encryption algorithm, and the embodiment of the disclosure is not limited to the hash algorithm of FIG. 12.

Thereafter, as a code for checking the validity of the query, the calculated hash value 1251 #HASH_VALUE# may be inserted to the query instead of the predefined text 1202, and the query creating device 130 may create a query 1210 including the hash value 1251 #HASH_VALUE# for checking the validity. Thereafter, the query to which the hash value 1251 #HASH_VALUE# is inserted to an initial query 1201 may be transmitted to the monitoring device 150 via the DB device 140.

In addition, as shown in operation 1101, the code calculating unit 322 of the monitoring device 150 may identify a query acquired by inserting a predefined text 1221 #REPLACE_CODE# to an original query, instead of the hash value 1251 #HASH_VALUE# inserted as the code for checking from the received query 1210. In addition, as shown in operation 1103, the code calculating unit 322 of the monitoring device 150 may calculate a hash value 1261 using a hash algorithm 1260 as a code for checking validity of the query by performing the hash algorithm 1260. Thereafter, the monitoring device 150 may compare the hash value 1261 calculated by the hash algorithm 1260 and the hash value 1251 included in the received query 1210, and may determine whether the received query is a valid query from the comparison result.

Various embodiments of the disclosure provide a method for monitoring a database. The method for monitoring the database according to various embodiments of the disclosure may include acquiring a query used in access of the database from the database, replacing a first code, included in the acquired query, for query checking to a predefined text, converting the text to a second code for query checking on the basis of code information, and outputting information on validity of the acquired query on the basis of a comparison result of the first code and the second code. In various embodiments of the disclosure, the first code may be included in the acquired query as an annotation of the acquired query. In addition, in various embodiments of the disclosure, the first code may be disposed to a predetermined location of the acquired query. In addition, in various embodiments of the disclosure, the creating of the query may include determining the text on the basis of a type of the query. In addition, in various embodiments of the disclosure, the outputting of the information on the validity of the acquired query may include outputting an alarm which notifies that hacking to the database occurs if the first code and the second code are not matched to each other. In addition, in various embodiments of the disclosure, the outputting of the message may include displaying a screen which indicates the alarm through a display or transmitting a message which notifies the alarm to another apparatus.

Various embodiments of the disclosure may provide a method of creating a query to have access to a database. The method of creating the query to have access to the database according to various embodiments of the disclosure may include receiving information for access to the database, creating a query including a predefined text on the basis of the information, converting the text into a code for query checking, and transmit the query including the converted code for checking to the database through the transceiver. In various embodiments of the disclosure, the code for query checking may be included in the query as an annotation at a predetermined location of the query. In addition, in various embodiments of the disclosure, the creating of the query may include determining the text on the basis of a type of the query.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the present disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the present disclosure.

Various embodiments of the disclosure may provide a non-transitory computer readable medium including a plurality of instructions for monitoring of a database. The plurality of instructions, when executed by a processor, may allow the processor to execute operations of acquiring a query used in access of the database from the database, replacing a first code, included in the acquired query, for query checking to a predefined text, converting the text to a second code for query checking on the basis of code information, and outputting information on validity of the acquired query on the basis of a comparison result of the first code and the second code. In various embodiments of the disclosure, the first code may be included in the acquired query as an annotation of the acquired query. In addition, in various embodiments of the disclosure, the first code may be disposed to a predetermined location of the acquired query. In addition, in various embodiments of the disclosure, the creating of the query may include determining the text on the basis of a type of the query. In addition, in various embodiments of the disclosure, the outputting of the information on the validity of the acquired query may include outputting an alarm which notifies that hacking to the database occurs if the first code and the second code are not matched to each other. In addition, in various embodiments of the disclosure, the outputting of the message may include displaying a screen which indicates the alarm through a display or transmitting a message which notifies the alarm to another apparatus.

Various embodiments of the disclosure may provide a non-transitory computer readable medium including a plurality of instructions for creating a query to have access to a database. The plurality of instructions, when executed by a processor, may allow the processor to execute operations of receiving information for access to the database, creating a query including a predefined text on the basis of the information, converting the text into a code for query checking, and transmit the query including the converted code for checking to the database through the transceiver. In various embodiments of the disclosure, the code for query checking may be included in the query as an annotation at a predetermined location of the query. In addition, in various embodiments of the disclosure, the creating of the query may include determining the text on the basis of a type of the query.

In the aforementioned specific embodiments of the present disclosure, a component included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the present disclosure.

What is claimed is:

1. An apparatus for monitoring a database, the apparatus comprising:
a transceiver; and
a processor operatively coupled to the transceiver,
wherein the processor is configured to:
acquire a query used in an access of the database from the database through the transceiver;
identify a first code included in the acquired query from the database, wherein the first code is included in the acquired query as an annotation of the acquired query;
replace the first code, included in the acquired query, for query checking to a predefined text;
generate a second code based on the predefined text for query checking;
compare the first code and the second code; and
output information on validity of the acquired query based on a result of the comparison of the first code and the second code.

2. The apparatus of claim 1, wherein the first code is disposed to a predetermined location of the acquired query.

3. The apparatus of claim 1, wherein the acquired query is a query identified as consuming a greater time than a predetermined time for data access among a plurality of queries used in the access to the database.

4. The apparatus of claim 1, wherein the processor is configured to determine the predefined text based on a type of the query.

5. The apparatus of claim 1, wherein the processor outputs an alarm which notifies that hacking to the database occurs if the first code and the second code are not matched to each other.

6. The apparatus of claim 5, wherein the processor is configured to display a screen which indicates the alarm through a display or to transmit a message which notifies the alarm to another apparatus.

7. An apparatus for creating a query to have access to a database, the apparatus comprising:
a transceiver; and
a processor operatively coupled to the transceiver,
wherein the processor is configured to:
receive information for an access to the database through the transceiver;
create a query including a predefined text based on the information,
wherein the predefined text is included in the query as an annotation of the query;
identify the predefined text included in the query;
convert the predefined text into a code for query checking, wherein the code for query checking is included in the query as the annotation at a predetermined location of the query; and transmit the query including the converted code for query checking to the database through the transceiver.

8. The apparatus of claim 7, wherein the processor is configured to determine the predefined text based on a type of the query.

9. A method for monitoring a database, the method comprising: acquiring a query used in an access of the database from the database;

identifying a first code included in the acquired query as an annotation of the acquired query from the database;

replacing the first code, included in the acquired query, for query checking to a predefined text;

generating a second code based on the predefined text for query checking; comparing the first code and the second code; and outputting information on validity of the acquired query based on a result of the comparison of the first code and the second code.

10. The method of claim 9, wherein the first code is disposed to a predetermined location of the acquired query.

11. The method of claim 9, wherein the acquired query is a query identified as consuming a greater time than a predetermined time for data access among a plurality of queries used in the access to the database.

12. The method of claim 9, wherein the acquiring of the query comprises determining the predefined text based on a type of the query.

13. The method of claim 9, wherein the outputting of the information on validity of the acquired query comprises outputting an alarm which notifies that hacking to the database occurs if the first code and the second code are not matched to each other.

14. The method of claim 13, wherein the outputting of the information on validity of the acquired query comprises displaying a screen which indicates the alarm through a display or transmitting a message which notifies the alarm to another apparatus.

* * * * *